US012690715B2

(12) United States Patent
Han et al.

(10) Patent No.: US 12,690,715 B2
(45) Date of Patent: *Jul. 28, 2026

(54) AIR FRYER

(71) Applicant: IB APPLIANCES US HOLDINGS LLC, Downers Grove, IL (US)

(72) Inventors: YuDe Han, Hangzhou (CN); Yi Qin, Ottawa (CA); HuaFeng Li, Hangzhou (CN)

(73) Assignee: IB APPLIANCES US HOLDINGS LLC, Chicago, IL (US)

( * ) Notice: Subject to any disclaimer, the term of this patent is extended or adjusted under 35 U.S.C. 154(b) by 559 days.

This patent is subject to a terminal disclaimer.

(21) Appl. No.: 18/313,951

(22) Filed: May 8, 2023

(65) Prior Publication Data

US 2023/0276982 A1 Sep. 7, 2023

Related U.S. Application Data

(63) Continuation of application No. 16/747,015, filed on Jan. 20, 2020, now Pat. No. 11,684,207.

(30) Foreign Application Priority Data

| Jan. 21, 2019 | (CN) | ......................... 201910052925.3 |
| Dec. 11, 2019 | (CN) | ......................... 201911269680.6 |

(51) Int. Cl.
*A47J 36/10* (2006.01)
*A47J 36/24* (2006.01)
(Continued)

(52) U.S. Cl.
CPC .............. *A47J 36/10* (2013.01); *A47J 36/24* (2013.01); *A47J 37/0641* (2013.01); *A47J 39/003* (2013.01); *A47J 47/16* (2013.01)

(58) Field of Classification Search
CPC .. A47J 37/0641; A47J 27/086; A47J 27/0802; A47J 27/09; A47J 36/32; A47J 2201/00; A47J 2202/00; A47J 27/002; A47J 27/004; A47J 27/0804; A47J 27/0815; A47J 27/092; A47J 27/12; A47J 36/06; A47J 36/10; A47J 36/16; A47J 37/0629;
(Continued)

(56) References Cited

U.S. PATENT DOCUMENTS

| 1,992,843 | A | * | 2/1935 | Serenberg | ............. A47J 27/004 |
| | | | | | 99/347 |
| 5,660,284 | A | * | 8/1997 | Vaughn | ................. A47F 7/0064 |
| | | | | | 211/186 |
| 11,684,207 | B2 | * | 6/2023 | Han | ..................... A47J 37/0641 |
| | | | | | 99/341 |

(Continued)

FOREIGN PATENT DOCUMENTS

| CA | 2271633 | * 11/1999 |
| CA | 2271633 A1 | 11/1999 |

(Continued)

*Primary Examiner* — Vy T Nguyen
(74) *Attorney, Agent, or Firm* — Crowell & Moring LLP

(57) ABSTRACT

An air fryer comprises a main body and a lid assembly. The lid assembly is operable to removably cover the main body. The air fryer comprises a support structure removably assembled to the lid assembly; wherein the support structure is operable to be seated on a working surface for supporting the lid assembly, thereby providing convenient placement of the lid assembly.

18 Claims, 9 Drawing Sheets

(51) Int. Cl.
  *A47J 37/06* (2006.01)
  *A47J 39/00* (2006.01)
  *A47J 47/16* (2006.01)

(58) Field of Classification Search
  CPC ................ A47J 37/0664; A47J 37/0694; A47J
      37/1257; A47J 37/1266; A47J 37/128;
      F24C 15/004; F24C 15/023; F24C 15/08;
      F24C 15/16; F24C 15/322; F24C 7/046;
      F24C 7/067; H05B 3/40
  USPC ......... 99/340, 324, 330, 331, 333, 403, 447,
      99/449; 211/41.11, 41.1, 175, 181.1, 186,
      211/206, 32, 41.5, 96; 248/175, 176.2,
      248/346.11, 157, 176.1, 201, 292.13, 423;
      26/275 E; 126/299 E; 219/392, 403,
      219/413, 450.1; 220/200, 379, 573.1,
      220/628, 631, 744, 756, 759, 768, 832;
      D7/365, 601
  See application file for complete search history.

(56) References Cited

U.S. PATENT DOCUMENTS

| | | | | |
|---|---|---|---|---|
| 2012/0145865 | A1* | 6/2012 | Wong ...................... | A47J 36/34 |
| | | | | 248/346.11 |
| 2015/0122137 | A1* | 5/2015 | Chang ................. | A47J 37/0641 |
| | | | | 220/573.1 |
| 2015/0250357 | A1* | 9/2015 | Zhitnitsky .............. | F16M 11/38 |
| | | | | 248/176.2 |
| 2015/0282616 | A1* | 10/2015 | Weis ...................... | A47J 47/16 |
| | | | | 211/41.1 |

FOREIGN PATENT DOCUMENTS

| | | | |
|---|---|---|---|
| CN | 200957038 | | 10/2007 |
| CN | 203369795 | | 1/2014 |
| CN | 204363843 | | 6/2015 |
| TW | M514279 U | * | 12/2002 |
| WO | WO 2020/087714 A1 | | 5/2020 |
| WO | WO 2020087714 | * | 5/2020 |

* cited by examiner

AIR FRYER

RELATED APPLICATIONS

This application is a continuation of U.S. patent application Ser. No. 16/747,015, filed on Jan. 20, 2020, pending, which claims priority to China Patent Application No. 201910052925.3, filed Jan. 21, 2019 and is entitled "Air Fryer", and China Patent Application 201911269680.6, filed Dec. 11, 2019, all of which are hereby incorporated by reference in their entireties.

TECHNICAL FIELD

The present invention relates generally to the field of small kitchen appliances, and more particularly to an air fryer.

BACKGROUND

Air fryers have become popular among consumers. In contrast to the conventional method of frying food with hot oil, air fryers use air as a heat transfer carrier, and as such can effectively reduce the amount of oil used in cooking and produce healthier food. Currently, there are generally two types of air fryers: drawer type and flip-open type. A flip-open type air fryer typically includes an upper lid and a cooker body. The upper lid and the cooker body are rotatably connected via a shaft, wherein the upper lid can be rotated about the shaft within a predetermined range of opening angles to allow the opening and closing of the upper lid relative to the cooker body. However, after the cooking is done, the detached upper lid of a conventional air fryer can be cumbersome to dispose due to its high temperature, thus causing inconvenience to the users.

SUMMARY

The present invention provides an air fryer having a lid assembly that allows for convenient placement.

In accordance with one aspect of the present disclosure, there is provided an air fryer comprising: a main body; a lid assembly for covering the main body and being removable from the main body; and a support structure removably assembled to the lid assembly and being operable to be placed on a working surface to support the lid assembly on the support structure.

In accordance with some embodiments of the present disclosure, the lid assembly comprises an outer lid shell having a downward opening; a hot air assembly disposed within the outer lid shell for generating hot air in a substantially downward direction; and a lid handle disposed on top of the outer lid shell and being operable for lifting the lid assembly; wherein the support structure has at least a first and a second modes of operation; wherein in the first mode, when cooking using the air fryer is completed, the support structure is fastened to and covering the lid assembly for ease of placement or storage; and wherein in the second mode, while the cooking using the air fryer is ongoing, the support structure is rested on a working surface such as a countertop, for direct placement of the lid assembly on the support structure or retrieval therefrom.

In accordance with some embodiments of the present disclosure, the support structure comprises a plate-shaped base, the base comprising an upper surface constructed and arranged to be substantially flat and smooth; wherein in the second mode, the lid assembly is placed in such a manner that the upper surface is upwardly facing the hot air assembly of the lid assembly.

In accordance with some embodiments of the present disclosure, the support structure comprises a plurality of first locking members; the lid assembly comprises a plurality of second locking members constructed and arranged to correspond in location with the plurality of first locking members; wherein when the support structure is in the first mode, each of the first locking members is positioned to engage or align with a corresponding second locking member on a side thereof proximal to the lid assembly, so as to fasten the support structure to the lid assembly; wherein rotating the support structure for a predetermined angle relative to the lid assembly will position the first locking members to disengage from the second locking members, thereby disengaging the support structure from the lid assembly.

In accordance with some embodiments of the present disclosure, the base comprises an upper surface and an opposing lower surface; the support structure comprises at least one first reinforcing rib extending from the lower surface; wherein in the second mode of operation of the support structure, the at least one first reinforcing rib is operable to be seated on top of the working surface, allowing the lid assembly to be placed on top of the upper surface.

In accordance with some embodiments of the present disclosure, the base is substantially circular in shape; the at least one first reinforcing rib is substantially of annular shape; the support structure further comprises at least one second reinforcing rib extending downwardly from the base; wherein the at least one second reinforcing rib is substantially of annular shape and is arranged to be substantially concentric with the at least one first reinforcing rib.

In accordance with some embodiments of the present disclosure, the support structure further comprises at least one third reinforcing rib extending downwardly from the base; wherein the at least one third reinforcing rib is constructed and arranged to radially connect with the at least one first reinforcing rib and the at least one second reinforcing rib so as to reinforce the strength of the at least one first reinforcing rib.

In accordance with some embodiments of the present disclosure, the lid assembly comprises a protrusion member; the main body comprises a receiving groove; wherein the protrusion member is operable to engage with the receiving groove, thereby substantially preventing the lid assembly from rotating relative to the main body; wherein the at least one first reinforcing rib of the support structure comprises a cut-out portion; wherein when the support structure is in the first mode of operation, the protrusion member is received at the cut-out portion.

In accordance with some embodiments of the present disclosure, the cut-out portion extends through a thickness of the base, so as to receive the protrusion member when the support structure is in the second mode of operation.

In accordance with some embodiments of the present disclosure, the lid assembly comprises a first periphery rim; the support structure comprises at least one elastic fastener operable to engage the first peripheral rim; wherein in the first mode of operation, the at least one elastic fastener buckles to engage the first peripheral rim so as to fasten the support structure to the lid assembly; wherein in a second mode, the at least one elastic fastener opens to disengage the first peripheral rim, wherein the support structure is operable to be placed on the working surface, thereby allowing the lid assembly to be readily stored on the support structure and retrieved therefrom at any time.

In accordance with some embodiments of the present disclosure, the support structure comprises asbestos or quartz or like materials embedded therein, thereby avoiding burns or damages on the support structure caused by the lid assembly.

In accordance with some embodiments of the present disclosure, the lid assembly comprises an outer lid shell; and a viewing window disposed on the outer lid shell; the main body comprises a cooking chamber; wherein the viewing window allows a user to observe cooking progress of the food within the cooking chamber.

In accordance with some embodiments of the present disclosure, the lid assembly comprises an illumination device disposed on the outer lid shell; the main body comprises a cooking chamber; wherein the illumination device is operable to illuminate the cooking chamber.

In accordance with some embodiments of the present disclosure, the main body comprise a shell body, the shell body comprising at least one receiving socket; the lid assembly comprises an outer lid shell, the outer lid shell comprising at least one positioning member operable to be secured to the at least one receiving socket for supporting the lid assembly onto the main body; wherein the at least one positioning member extends rearwardly from a rear side of the outer lid shell and projecting beyond a periphery edge of the outer lid shell.

In accordance with some embodiments of the present disclosure, the air fryer comprises a support frame for supporting the lid assembly, the supporting frame comprising: a pair of horizontally disposed support segments each having opposite ends; two pairs of connecting segments bendingly extending from the opposite ends of the support segments, respectively; and a pair of positioning segments each connecting one of the two pairs of the connecting segments.

In accordance with some embodiments of the present disclosure, the lid assembly comprises a first periphery rim and a second periphery rim extending from the first periphery rim, thereby allowing the lid assembly to fit with another main body of different size.

In accordance with some embodiments of the present disclosure, the main body comprises a shell body and a first coupler assembled to the shell body; the lid assembly comprises an outer lid shell; a second coupler assembled to the outer lid shell; and a hot air assembly connected to the second coupler; wherein opening the lid assembly relative to the main body will cause the first coupler to disconnect from the second coupler, thereby stopping the operation of the hot air assembly.

In accordance with some embodiments of the present disclosure, the hot air assembly comprises a fan; the main body comprises a shell body and a pot body assembled to the shell body; wherein the fan is inclinedly oriented relative to the pot body.

In accordance with some embodiments of the present disclosure, the lid assembly comprises a protective cover assembled to the outer lid shell, the protective cover comprising a bottom wall and a sidewall extending from the bottom wall; wherein the bottom wall and the sidewall define an enclosure therebetween; wherein the hot air assembly is disposed within the enclosure; and wherein the bottom wall is inclinedly oriented relative to the pot body.

An air fryer in accordance with example embodiments of the present disclosure comprises a support structure removably assembled to the lid assembly; wherein the support structure is operable to be seated on a working surface for supporting the lid assembly, thereby providing convenient placement of the lid assembly.

DETAILED DESCRIPTION

Figure 1:
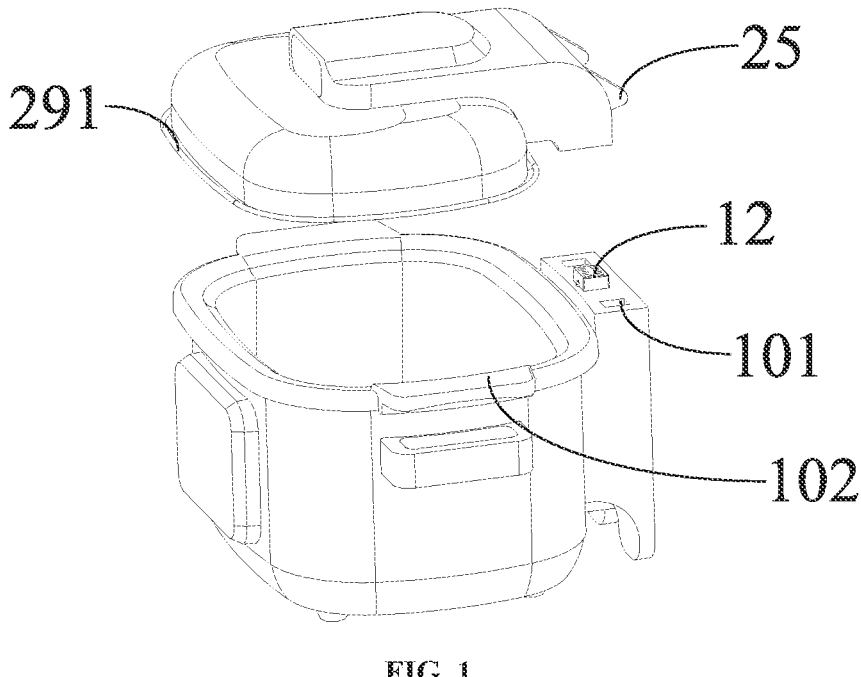
FIG. 1 is a perspective view illustrating an air fryer in accordance with an example embodiment of the present disclosure, with a lid assembly unassembled to the main body of the air fryer.
Figure 2:
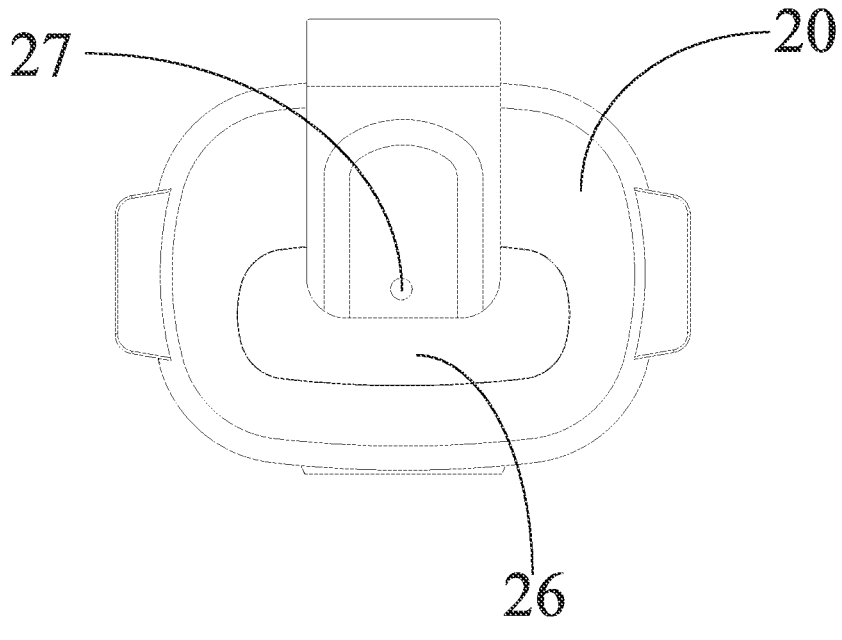
FIG. 2 is a top view of the lid assembly of the air fryer of FIG. 1.

Exemplary embodiments will be described in detail herein, examples of which are illustrated in the accompanying drawings. When the following description refers to the accompanying drawings, unless otherwise indicated, the same numbers in different drawings represent the same or similar elements. The embodiments described in the following exemplary embodiments do not represent all embodiments consistent with the present invention. Instead, they are merely examples of devices consistent with some aspects of the present disclosure as detailed in the appended claims.

The terms used in the present application are for the purpose of describing particular embodiments only, and are not intended to limit the present application. Unless otherwise defined, technical terms or scientific terms used herein should have the ordinary meanings as understood by those having ordinary skilled in the art to which the invention pertains. The words "first", "second" and similar terms used in the specification and claims of the present application do not denote any order, quantity, or importance, but are merely used to distinguish different components. Similarly, the words "a" or "an" and the like do not denote a quantity limitation, but mean that there is at least one. "Multiple" or "several" means two or more. Unless otherwise indicated, the terms "front", "rear", "lower" and/or "upper" and the like are used for convenience of description and are not limited to one location or one spatial orientation. "Including" or "comprising" and similar words mean that the elements or objects that appear before "including" or "comprising" encompass the elements or objects listed after "including" or "comprising" and their equivalents, and do not exclude other elements or objects. The words "connection" or "connected" and the like are not limited to physical or mechanical connections, but may include electrical connections, whether direct or indirect. As used herein and in the appended claims, the singular forms "a", "said", and "the" are intended to include the plural forms unless the context clearly dictates otherwise. It should also be understood that, as used herein, the term "and/or" refers to and includes any or all possible combinations of one or more of the associated listed items.

Referring to FIGS. 1-4, an air fryer according to an example embodiment of the present disclosure comprises a main body 1 and a lid assembly 2 operable to engage with the main body 1 in an open mode and a closed mode for covering the main body 1. The main body 1 comprises a shell body 10, a pot body 11 assembled to the shell body 10, and a first coupler 12. The shell body 10 comprises two receiving sockets 101 disposed at a rear peripheral portion of the shell body 10. The first coupler 12 comprises at least one first contact member (not numbered) disposed therein for connecting with a mating member. The pot body 11 comprises a pot body handle 102 allowing a user to remove the pot body 11 from the shell body 10.

In some embodiments, the lid assembly 2 can be opened and disengaged from the main body 1 for placement on a working surface such as a countertop. The lid assembly 2 comprises an outer lid shell 20, a second coupler 21 assembled to a rear portion of the outer lid shell 20, a protective cover 24, a hot air assembly 22 coupled to the second coupler 21, two positioning members 25 operable to be at least partially inserted into the two receiving sockets 101 of the shell body 10, a viewing window 26 disposed on the outer lid shell 20, and an illumination device 27. In some embodiments, the outer lid shell 20 comprises a first periphery rim 291. The outer lid shell 20 is constructed and arranged to cover the hot air assembly 22 from above.

In some embodiments, the at least one positioning member 25 extends rearwardly from a rear side of the outer lid shell 20 and projecting beyond a periphery edge of the outer lid shell 20.

The at least one positioning member 25 can be integrally formed with the outer lid shell 20 to form a single piece construction, or can be assembled to the outer lid shell 20.

In some embodiments, the protective cover 24 comprises a bottom wall 240, and a sidewall 241 extending from the bottom wall 240. The bottom wall 240 and the sidewall 241 define an enclosure or form an enclosed space (not numbered). The hot air assembly 22 is disposed within the enclosure. The bottom wall 240 comprises one or more arc-shaped perforations 242 constructed and arranged to allow the hot air generated by the hot air assembly 22 to pass through. The protective cover 24 is constructed and arranged to direct and/or limit a flow of the hot air generated by the hot air assembly 22 in such a way as to ensure the generated hot air is substantially completely directed into the pot body 11, thereby increasing the thermal efficiency of the air fryer disclosed herein, while preventing the hot air assembly 22 from directly contacting with food, and preventing the lid assembly 2 from scalding the user or other objects upon detaching the lid assembly 2 from the main body 1. In some embodiments, the second coupler 21 comprises at least one second contact member 210, wherein the hot air assembly 22 is connected to the at least one second contact member 210.

As illustrated in the figures, the hot air assembly 22 comprises a fan 220, a motor 221, a temperature controller (not numbered), and a heating tube (not numbered). The heating tube is operable to be heated in accordance with instructions from the temperature controller based on the temperature readings obtained by the temperature controller. The motor 221 is operable to drive the fan 220 to blow the air heated by the heating tube into the pot body 11.

Figure 3:
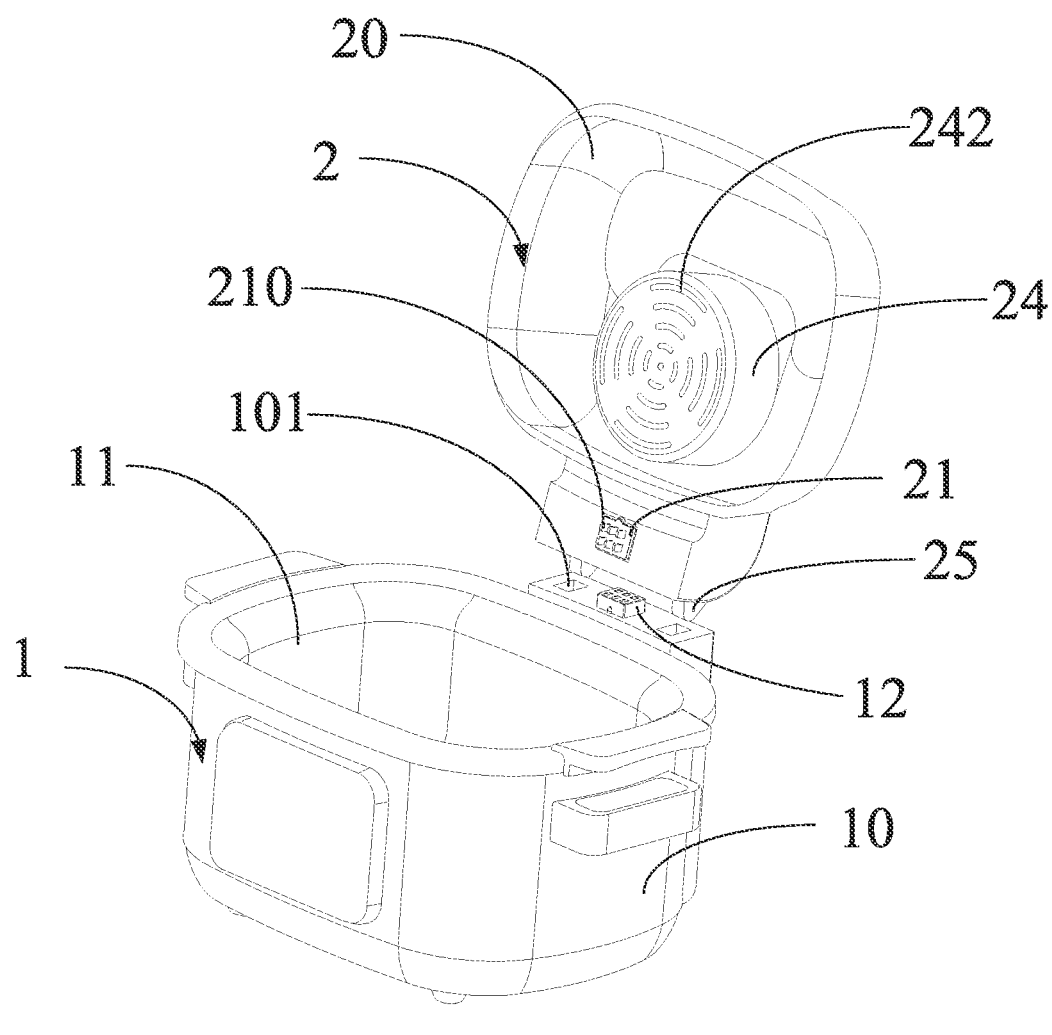
FIG. 3 is a perspective view of the air fryer of FIG. 1, illustrating the manner of engagement prior to the insertion of a lid assembly onto the main body.
Figure 4:
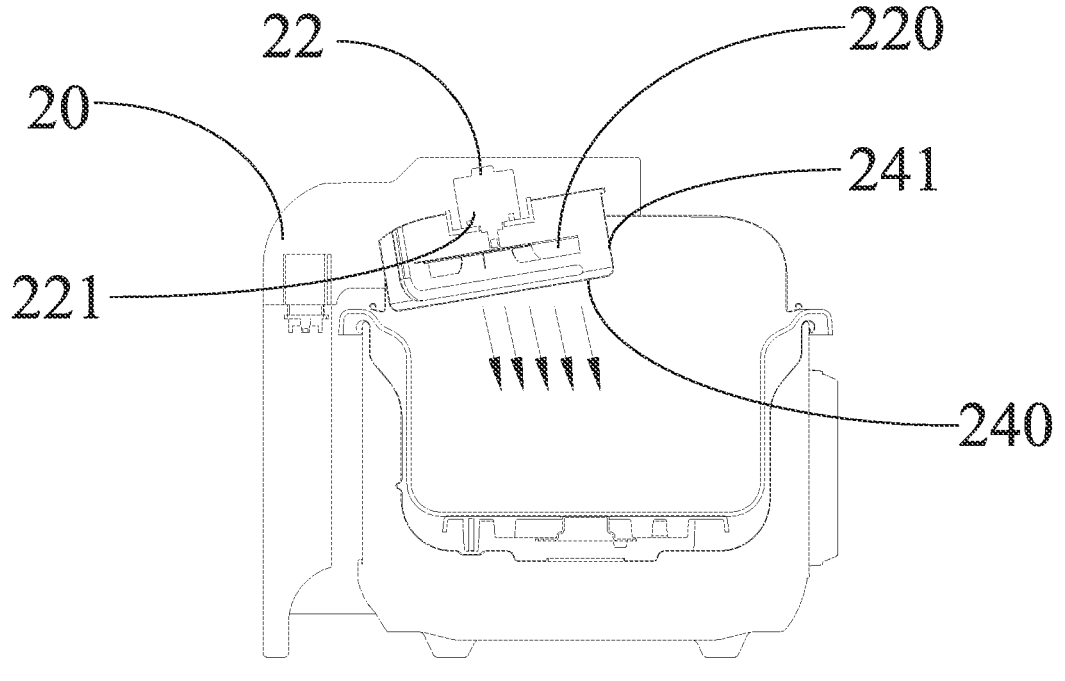
FIG. 4 is a schematic cross-sectional view of the air fryer of FIG. 1.

Upon detachment of the lid assembly 2 from the main body 1, a user can insert the at least one positioning member 25 into the at least one receiving socket 101, so as to securely place the lid assembly 2 onto the main body 1. In some embodiments, as shown in FIG. 3, the shell body 10 comprises a pair of receiving sockets 101, and the lid assembly 2 comprises a pair of positioning members 25. However, the present disclosure is not limited as such. The numbers of the receiving sockets 101 and the positioning members 25 can be adjusted as required in practice, and are not limited by the present disclosure.

Upon closing the lid assembly 2 to cover the main body 1, the at least one first contact member of the first coupler 12 electrically connects with the at least one second contact member 210 of the second coupler 21, thereby activating the hot air assembly 22 to operate.

Upon opening the lid assembly 2 with respect to the main body 1, the at least one first contact member of the first coupler 12 electrically disconnects from the at least one second contact member 210 of the second coupler 21, thereby stopping the operation of the hot air assembly 22 and improving the safety of the air fryer disclosed herein.

When the lid assembly 2 is in the closed mode, the viewing window 26 provides visibility to the interior of a cooking chamber of the main body 1 and allows the user to observe cooking progress of the food within the cooking chamber. The illumination device 27 can be switched on to illuminate the pot body 11, so as to allow the user to clearly observe cooking progress of the food within the cooking chamber of the main body 1.

In some embodiments, the fan 220 is disposed at a rear portion of the lid assembly 2, so as to provide a larger area at a front portion of the lid assembly 2 for accommodating the installation of the viewing window 26. In addition, with such configuration of the fan 220, the heated air will start to flow near the rear portion of the lid assembly 2 and travel downwardly toward the food, and then flow upwardly, returning to the hot air assembly 22 near the front portion of the lid assembly 2, where the returned air flow will be subject to further heating before being circulated again toward the food. Furthermore, in some embodiments, in order to provide more hot air directly toward the food, the fan 220 is inclinedly disposed or oriented relative to the pot body 11. For example, the bottom wall 240 of the protective cover 24 is inclinedly oriented relative to the pot body 11, so as to allow the heated air generated by the fan 220 to be blown at an angle toward a location that is slightly rearward relative to a center of the pot body 11, wherein such location allows the hot air to have an ample flow toward the food and a more thorough contact with food, thereby quickly and uniformly heating the food.

Figure 5:
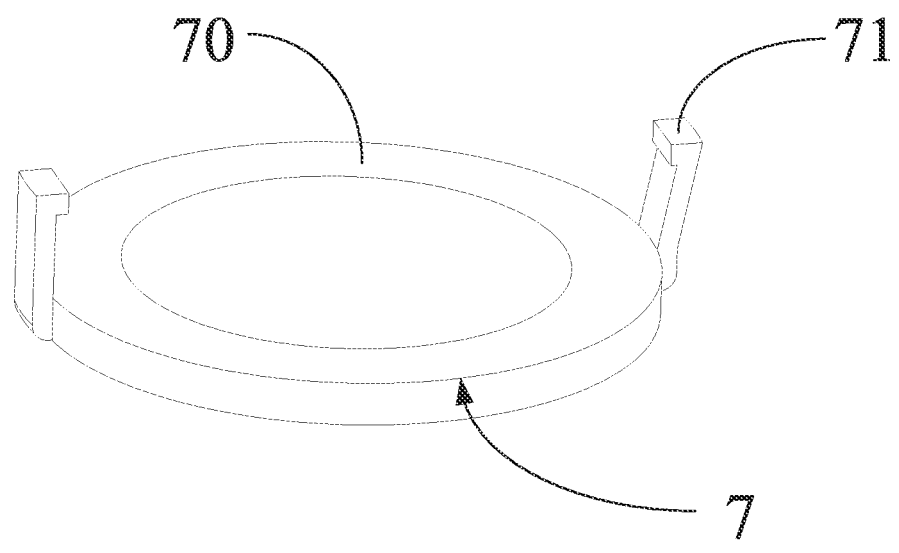
FIG. 5 is a perspective view of a support frame in accordance with an example embodiment of the present disclosure, for use with the air fryer of FIG. 1.

Referring to FIG. 5, in some embodiments, the air fryer in accordance with the present disclosure further comprises a support structure 7 constructed and arrange for assembling to the lid assembly 2. The support structure 7 comprises a base 70, and at least one elastic fastener 71 extending from the base 70. The base 70 is substantially made of plastic material, and being embedded with asbestos or quartz or like materials as insulation, thereby avoiding burns or damages on the support structure 7 caused by the lid assembly 2. The at least one elastic fastener 71 is operable in at least two modes: in a first mode during packaging and transportation process, the fastener 71 buckles inwardly to engage a first peripheral rim 291 of the lid assembly 2, so as to fasten the support structure 7 to the lid assembly 2, and form a storage space between the support structure 7 and the lid assembly 2 for storing relevant parts for the air fryer described herein, such as power cord etc.; in a second mode, the fastener 71 opens outwardly to disengage the first peripheral rim 291 of the lid assembly 2, wherein the support structure 7 is operable to be placed on a countertop to support the lid assembly 2, thereby allowing the lid assembly 2 to be readily stored on the support structure 7 and retrieved therefrom at any time.

Figure 6:
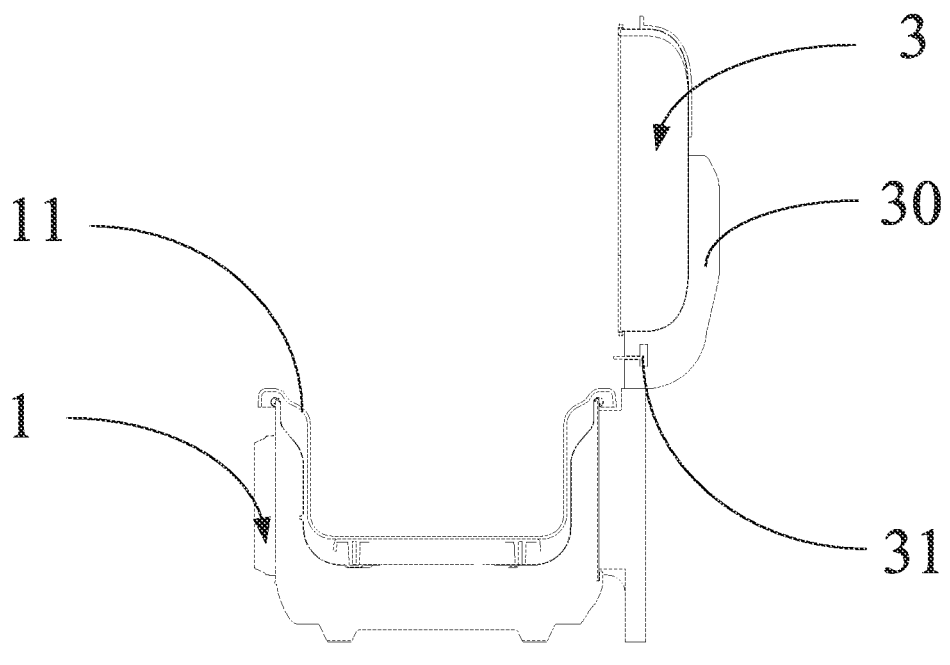
FIG. 6 is a schematic cross-sectional view of an air fryer in accordance with another example embodiment of the present disclosure.

Referring to FIG. 6, in some embodiments, the lid assembly 3 comprises a switch 31 assembled to the outer lid shell 30. Upon closing the lid assembly 3 to cover the main body 1, the switch 31 comes into contact with the pot body 11 to allow a supply of power to be provided to the air fryer. Upon opening the lid assembly 3 with respect to the main body 1, the switch 31 disconnects from the pot body 11 to cut off the supply of power to the air fryer so as to stop the air fryer from operating. Thus, the lid assembly 3 is prevented from starting the heating operation in case the pot body 11 is not received within the main body 1, thereby avoiding damaging the main body 1 or the lid assembly 3 by mistake.

Figure 7:
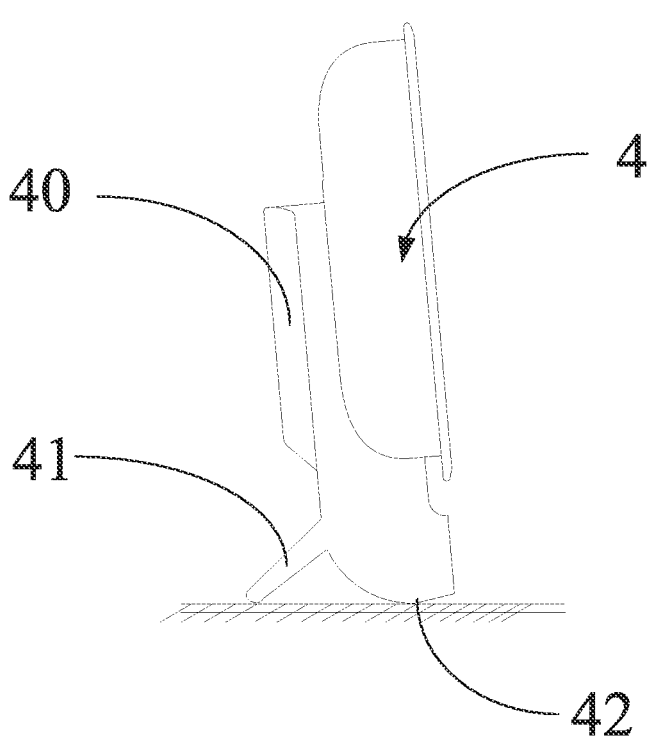
FIG. 7 is a side view of a lid assembly of an air fryer in accordance with another example embodiment of the present disclosure.

Referring to FIG. 7, in some embodiments, the lid assembly 4 comprises a first support part 41 inclinedly extending in an upward and outward manner from a top portion of the outer lid shell 40, and a corresponding second support part 42 disposed near a side portion of the outer lid shell 40. The first support part 41 and the second support part 42 can be rested on a working surface, so as to support the lid assembly 4 on the working surface in a sideward upright orientation. The first support part 41 can be integrally formed with the outer lid shell 40 to form a single piece construction, or can be assembled to the outer lid shell 40.

Figure 8:
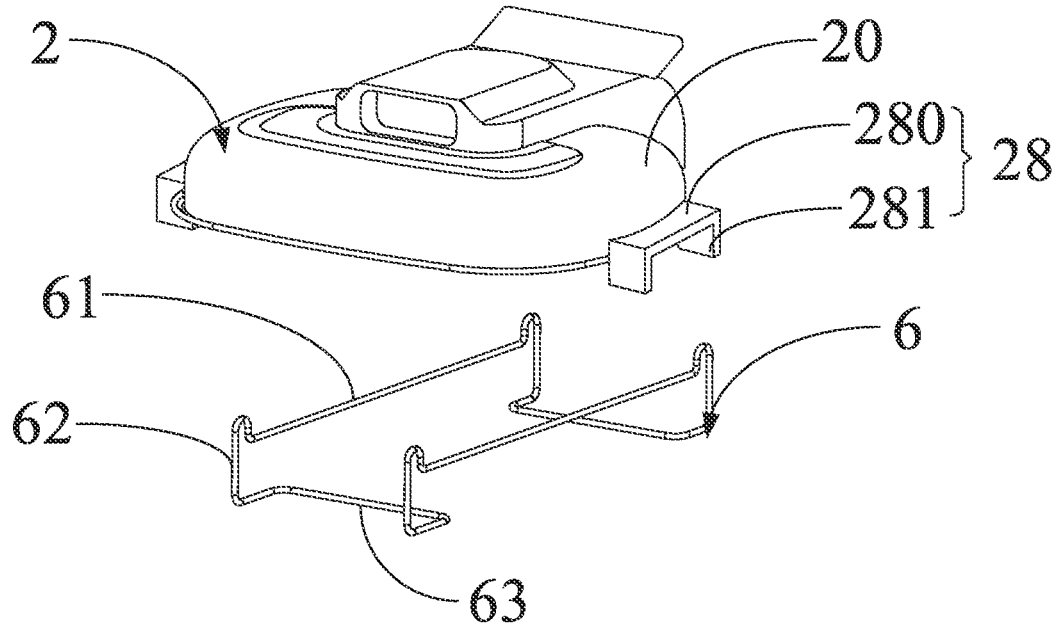
FIG. 8 is a perspective view of a lid assembly of an air fryer in accordance with another example embodiment of the present disclosure.

Referring to FIG. 8, in some embodiments, the air fryer comprises a support frame 6 for supporting the lid assembly 2 thereon. The support frame 6 is formed from at least one segment of bent metal wire, and comprises a pair of horizontally disposed support segments 61 each having opposite ends; two pairs of connecting segments 62 bendingly extending from the opposite ends of the support segments 61, respectively; and a pair of positioning segments 63 each connecting one of the two pairs of the connecting segments 62 extending from corresponding ends of the support segments 61, respectively. The pair of positioning segments 63 are substantially U-shaped and are oppositely disposed. In some embodiments, the lid assembly 2 comprises two support members 28 disposed on opposite sides of the outer lid shell 20, wherein the support members 28 are configured to support the lid assembly 2 upon placement on a working surface and elevate or raise the lid assembly 2 above the working surface to an elevated position.

In some embodiments, the support members 28 are substantially U-shaped, and can be integrally formed with the outer lid shell 20 to form a single piece construction, or can be assembled to the outer lid shell 20. The support members 28 each comprises an extension portion 280 extending outwardly from the outer lid shell 20; and a pair of support leg portions 281 extending downwardly from the extension portion 280, wherein the support leg portions 281 are operable to support the lid assembly 2 to a working surface. Upon removal of the lid assembly 2 from the main body 1, the lid assembly 2 can be supported to the working surface via the support members 28. As such, the support members 28 allow convenient placement of the lid assembly 2. In addition, the support members 28 elevate the hot air assembly 22 at a predetermined distance from the working surface, thereby preventing the hot air assembly 22 from causing burns on the working surface. Furthermore, the support members 28 may prevent the lid assembly 2 from toppling over caused by improper external force, thereby protecting the hot air assembly 22 and avoiding crashing or breaking the hot air assembly 22. Upon fitting the lid assembly 2 to the main body 1, the support members 28 cooperate or engage with one or more exterior sides of the pot body handle 102, thereby guiding the closure of the main body 1 using the lid assembly 2.

Figure 9:
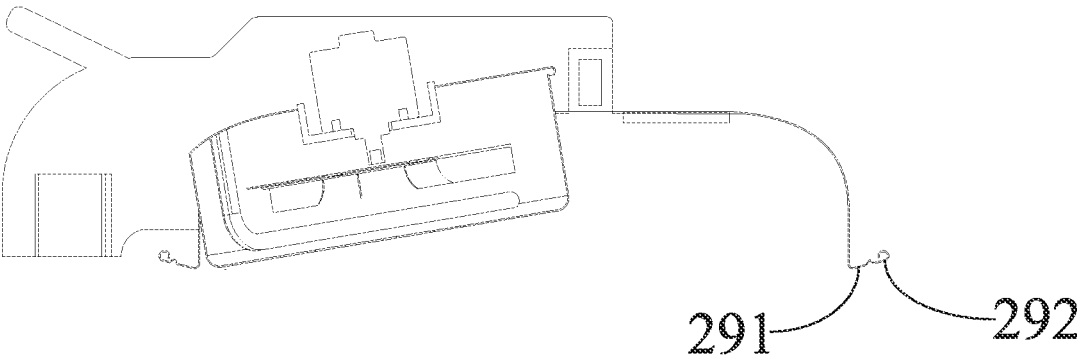
FIG. 9 is a sectional view of a lid assembly of an air fryer in accordance with another example embodiment of the present disclosure.
Figure 10:
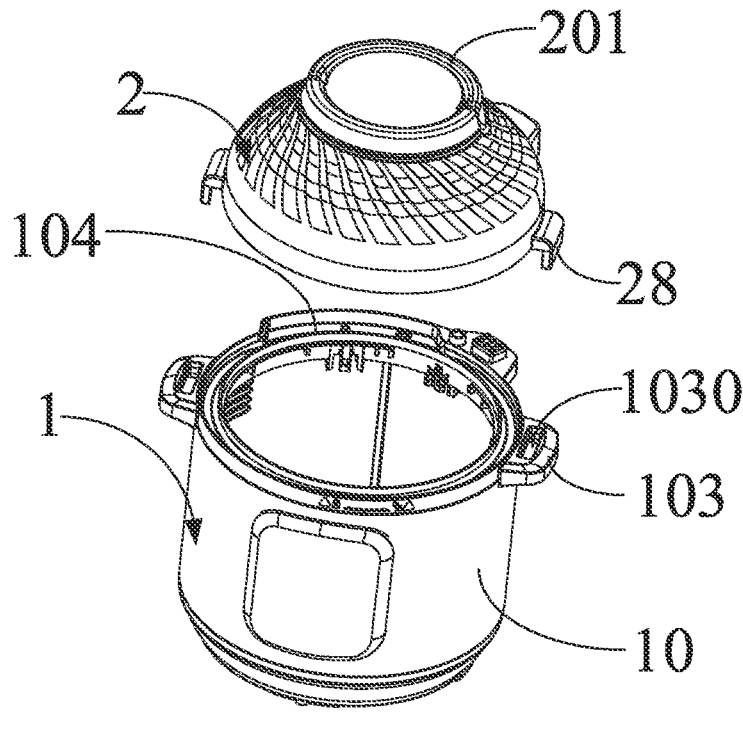
FIG. 10 is a perspective view illustrating an air fryer in accordance with another example embodiment of the present disclosure, with a lid assembly unassembled to the main body of the air fryer.
Figure 11:
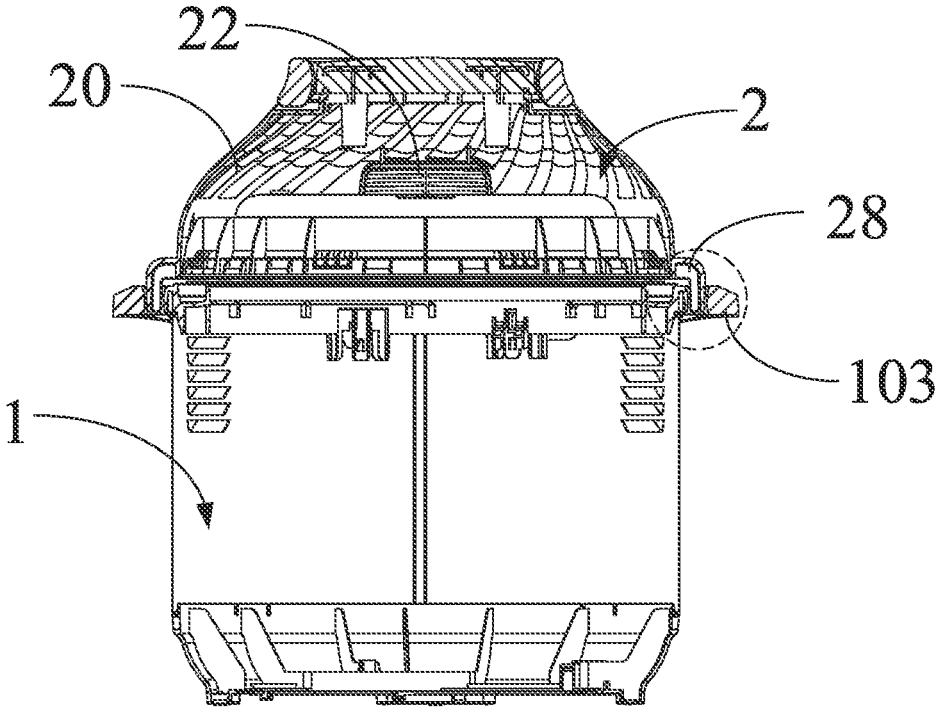
FIG. 11 is a schematic cross-sectional view of the air fryer of FIG. 10, wherein the lid assembly is assembled to the main body of the air fryer.
Figure 12:
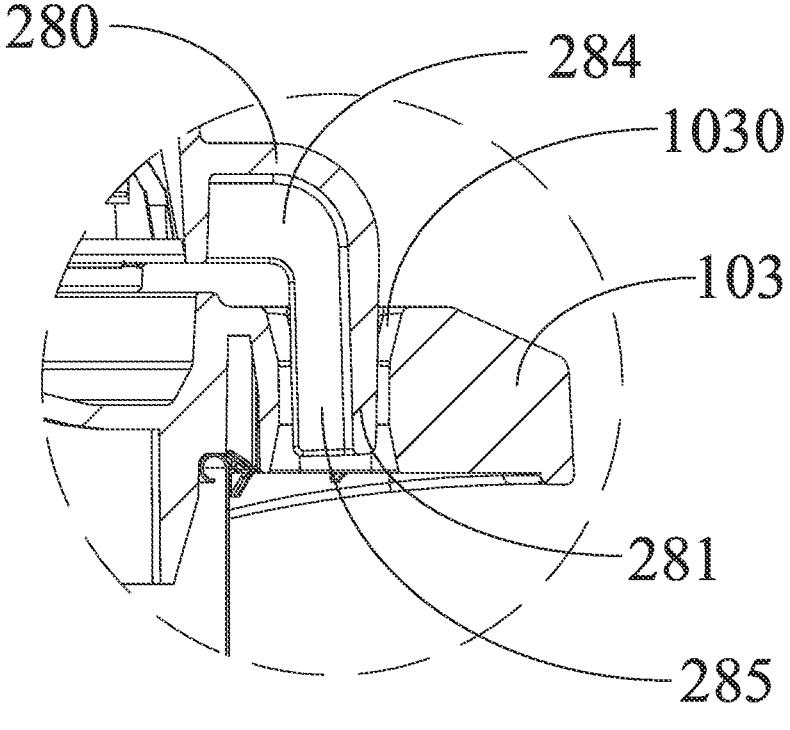
FIG. 12 is a magnified view of the circled area of FIG. 11.

Referring to FIG. 9, in some embodiments, the lid assembly 2 further comprises a second peripheral rim 292 extending from the first peripheral rim 291. In use, the first peripheral rim 291 can be used to engage or match with those main bodies having smaller volumes or diameters, while the second peripheral rim 292 can be used to engage or match with those main bodies having larger volumes or diameters, and as such, the same lid assembly can be adapted to fit with main bodies of different sizes, thereby reducing the number of accessories or parts for the air fryer and reducing the cost of production thereof.

Referring to FIGS. 10-14, in some embodiments, the main body 1 comprises a receiving groove 104 disposed on the shell body 10; and at least one outer pot handle 103 extending from the shell body 10. The outer pot handle 103 comprises a guiding groove 1030. In some embodiments, the guiding groove 1030 is formed as a perforated opening or aperture substantially centrally disposed on the outer pot handle 103 and proximal to an outer periphery of the main body 1, and is constructed and arranged for guiding the support member 28 in a plurality of orientations, and for ease of cleaning.

In some embodiments, the lid assembly 2 comprises an outer lid shell 20 having a downward opening; a hot air assembly 22 disposed within the outer lid shell 20 for generating hot air in a substantially downward direction; a lid handle 201 disposed on top of the outer lid shell 20; at least one support member 28 connected to the outer lid shell 20; and a protrusion member 293 connected to the outer lid shell 20. The lid handle 201 is operable for lifting the lid assembly 2. The protrusion member 293 is operable to engage with the receiving groove 104 thereby substantially preventing the lid assembly 2 from rotating relative to the main body 1.

In some embodiments, the support member 28 comprises an extension portion 280 extending outwardly from the outer lid shell 20; at least one support leg portion 281 extending downwardly from the extension portion 280; at least one first sidewall 284 extending from the extension portion 280 toward the main body 1; at least one second sidewall 285 extending from the support leg portion 281 toward the main body 1; and at least one protrusion rib 286 outwardly extending from the second sidewall 285. The protrusion rib 286 reduces an area of engaging surface between the second sidewall 285 and the guiding groove 1030, thereby reducing the resistance incurred during insertion of the support member 28 or a portion thereof into the guiding groove 1030 and removal of the support member 28 or a portion thereof from the guiding groove 1030. In some embodiments, the first sidewall 284 is disposed to be substantially perpendicular to the extension portion 280, whereas the second sidewall 285 is disposed to be substantially perpendicular to the support leg portion 281, thereby providing increased stability when the support leg portion 281 is on a working surface for weight-bearing. Using the support leg portion 281 of the support member 28, the lid assembly 2 can be supported to the working surface such as a countertop, thereby allowing convenient placement of the lid assembly 2. In addition, by way of providing support while being seated on top of the working surface, the support leg portion 281 elevates the hot air assembly 22 at a predetermined height from the working surface, thereby avoiding burns on the working surface. Furthermore, the support leg portion 281 may prevent the lid assembly 2 from toppling over caused by improper external force, thereby avoiding crashing or breaking the hot air assembly 22.

Advantageously, the at least one first sidewall 284 and the at least one second sidewall 285 increase the strength of the support member 28, while the second sidewall 285 can be configured to provide positional and/or directional guidance to the support member 28 when the support member 28 or a portion thereof is engaged with or assembled to the guiding groove 1030. Further referring to FIG. 15, in some embodiments, the support member 28 further comprises at least one rib portion 283, the rib portion 283 being connected to the outer lid shell 20, the extension portion 280, and the support leg portion 281; wherein the rib portion 283 is constructed and arranged to extend from the outer lid shell 20 toward the second sidewall 285, and is substantially parallel with the first sidewall 284, thereby reinforcing the strength of the at least one support member 28.

In some embodiments, when the lid assembly 2 is assembled to or engaged with the main body 1, the at least one support member 28 engages with the guiding groove 1030 so as to securely fastening the lid assembly 2 to the main body 1, and substantially preventing the lid assembly 2 from rotating relative to the main body 1. It is to be noted that the description of example embodiments with reference to FIGS. 10-15 is mostly directed to the features that are particularly relevant to these embodiments; while other common features may be applicable, those common features are previously described in connection with other example embodiments of the present disclosure without limitation and will not be repeated herein.

Figure 16:
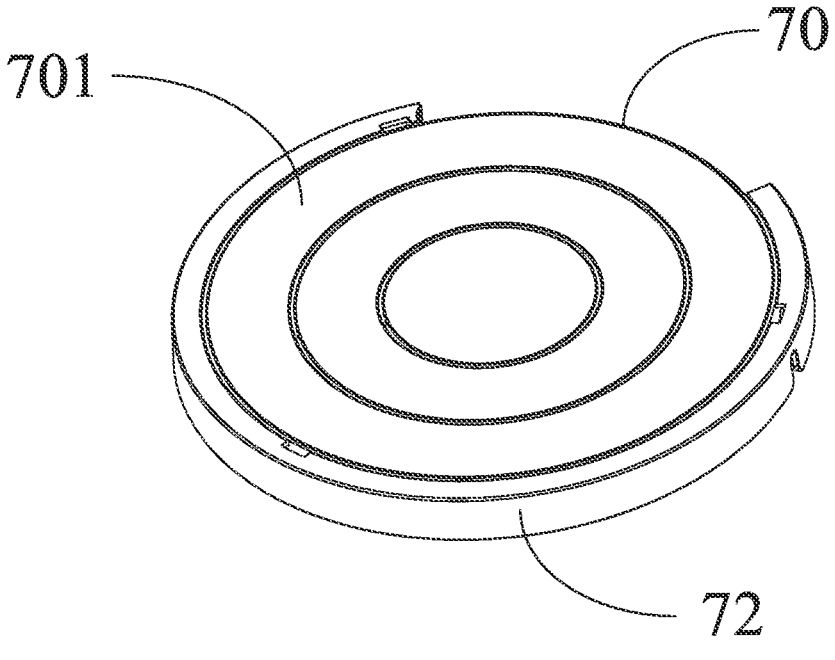
FIG. 16 is a perspective view of the support frame of FIG. 5 in accordance with another example embodiment of the present disclosure.
Figure 17:
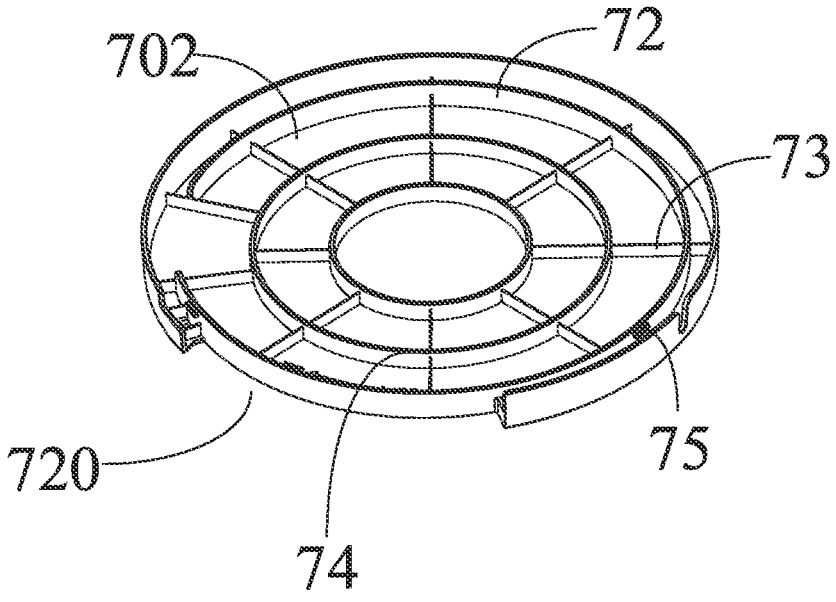
FIG. 17 is a bottom view of the support frame of FIG. 16.

Referring to FIGS. 16-17, in some embodiments, the support structure or board 7 comprises a plate-shaped base 70; at least one first reinforcing rib 72 extending downwardly from the base 70; at least one second reinforcing rib 74; at least one third reinforcing rib 73; and a plurality of first locking members 75 disposed on the first reinforcing rib 72. In some embodiments, the first locking members 75 are constructed and arranged to extend downwardly from the base 70. The support structure 7 has at least two modes of operation. In the first mode, when cooking using the air fryer is completed, the support structure 7 is fastened to and covering the lid assembly 2 for ease of placement or storage. In the second mode, while cooking using the air fryer is ongoing, the support structure 7 is rested on a working surface such as a countertop, for direct placement of the lid assembly 2 on the support structure 7 or retrieval therefrom.

In some embodiments, the base 70 comprises an upper surface 701 and an opposing lower surface 702; wherein the at least one first reinforcing rib 72 extends from the lower surface 702. The base 70 is substantially circular in shape, and the first reinforcing rib 72 is substantially of annular shape. The at least one second reinforcing rib 74 is substantially of annular shape and is arranged to be substantially concentric with the first reinforcing rib 72. The at least one third reinforcing rib 73 is constructed and arranged to radially connect with the first reinforcing rib 72 and the second reinforcing rib 74 so as to reinforce the strength of the first reinforcing rib 72, whereas the first reinforcing rib 72 reinforces the strength of the base 70. In the second mode of operation of the support structure 7, the first reinforcing rib 72 can be rested on top of the working surface, allowing the lid assembly 2 to be placed on top of the upper surface 701. The upper surface 701 is constructed and arranged to be substantially flat and smooth for ease of cleaning. In this second mode of operation, the lid assembly 2 is placed in such a manner that the upper surface 701 is upwardly facing the hot air assembly 22 of the lid assembly 2.

Figure 13:
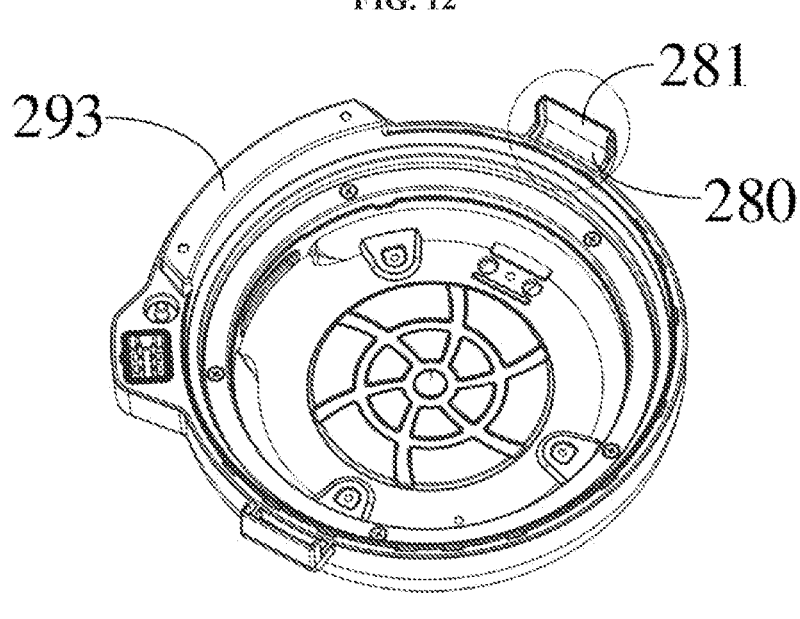
FIG. 13 is a perspective view of the lid assembly of the air fryer of FIG. 10.
Figure 14:
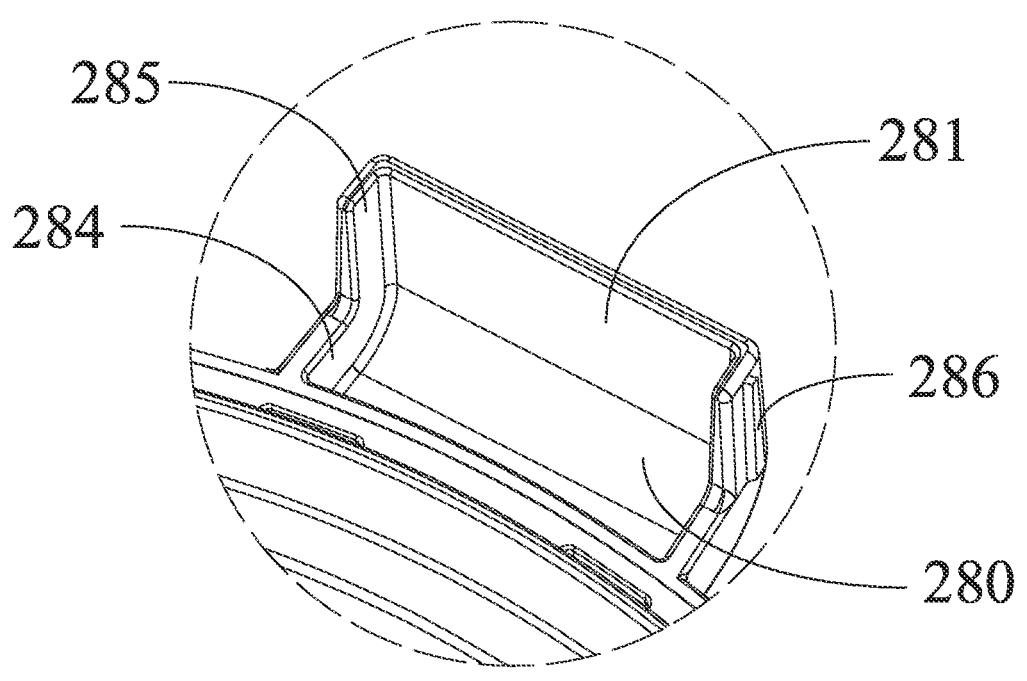
FIG. 14 is a magnified view of the circled area of FIG. 13.

Further referring to FIG. 13, in some embodiments, the lid assembly 2 comprises a protrusion member 293. To accommodate the protrusion member 293, the first reinforcing rib 72 of the support structure 7 comprises a cut-out portion 720, wherein when the support structure 7 is in the first mode of operation, the protrusion member 293 is received at the cut-out portion 720. The cut-out portion 720 extends through a thickness of the base 70, so as to receive the protrusion member 293 when the support structure 7 is in the second mode of operation.

Figure 15:
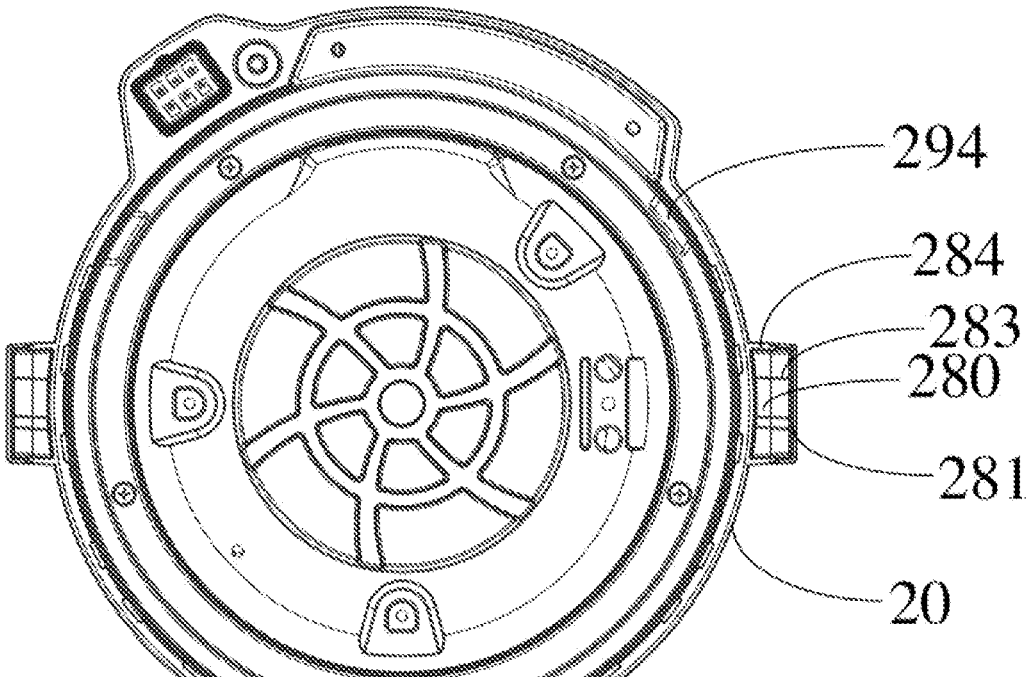
FIG. 15 is a bottom view of the lid assembly of FIG. 13 in accordance with another example embodiment of the present disclosure.

Further referring to FIG. 15, in some embodiments, the lid assembly 2 comprises a plurality of second locking members 294 constructed and arranged to correspond with the plurality of first locking members 75. When the support structure 7 is in the first mode, each of the first locking members 75 is positioned to engage or align with a corresponding second locking member 294 on a side thereof proximal to the lid assembly 2, i.e., on an interior side of the corresponding second locking member 294 facing an interior of the lid assembly 2, so as to fasten the support structure 7 to the lid assembly 2 for ease of storage. To detach the support structure 7 from the lid assembly 2, a user may rotate the support structure 7 for a predetermined angle relative to the lid assembly 2 so as to disengage the first locking members 75 from the second locking members 294, thereby disengaging the support structure 7 from the lid assembly 2. It is to be noted that the description of example embodiments of the support structure 7 with reference to FIGS. 16-17 in view of FIGS. 13 and 15 is mostly directed to the features that are particularly relevant to these embodiments; while other common features may be applicable, those common features are previously described in connection with other example embodiments of the support structure 7 of the present disclosure without limitation and will not be repeated herein.

An air fryer in accordance with example embodiments of the present disclosure comprises a support structure 7 removably assembled to a lid assembly 2; wherein the support structure 7 is operable to be seated on a working surface for supporting the lid assembly 2, thereby providing convenient placement of the lid assembly 2. In the meantime, when not in use, the support structure 7 is operable to be assembled to the lid assembly 2, thereby providing convenient placement of the support structure 7. An air fryer in accordance with example embodiments of the present disclosure comprises the first coupler 12 disposed on the main body 1; and the second coupler 21 disposed on the lid assembly 2; wherein a disconnection between the first coupler 12 and the second coupler 21 will terminate a supply of power to the hot air assembly 22 causing the hot air assembly 22 to stop operating, thereby improving the safety of the air fryer.

The foregoing description is of preferred embodiments of the present application only, and is not intended to limit the present application in any way. Without departing from the technical scope of the present application, a person of ordinary skills in the art may make certain modifications or equivalent substitutions to the disclosed technical contents. Any simple modifications, equivalent changes or equivalent substitutions made to the above embodiments in accordance with the technical principle of the present application are still within the scope of the technical solutions of the present application.

The invention claimed is:

1. A cooking appliance comprising:
a cooker body;
a lid for removably covering an opening to the cooker body, the lid comprising a heating element for generating heat within the cooker body when the lid is covering the opening; and,
a lid cover removably attachable to the lid and being operable to be placed on a working surface to support the lid, the lid cover having at least a first mode of operation and a second mode of operation;
wherein in the first mode, when cooking using the cooking appliance is complete, the lid cover may be attached to the lid for ease of placement or storage of the lid;
wherein in the second mode, when cooking using the cooking appliance is ongoing, the lid cover may be placed on the working surface, for placement of the lid on the lid cover, or retrieval therefrom, without the lid contacting the working surface; and,
wherein the lid cover is rotatable relative to the lid by a predetermined angle to removably detach the lid cover from the lid such that when cooking using the cooking appliance is ongoing, the lid is covering the opening of the cooker body without the lid cover attached to the lid.

2. The cooking appliance of claim 1, wherein the lid cover comprises a base having a first surface, and in the second mode, the first surface faces lid.

3. The cooking appliance of claim 2, wherein the base has a second surface opposite the first surface, wherein in the first mode, the second surface faces the lid.

4. The cooking appliance of claim 2, wherein:
the lid cover comprises a first plurality of locking members and the lid comprises a second plurality of locking members;
when the lid cover is in the first mode, each of the locking members of the first plurality engage or align with a corresponding locking member of the second plurality, so as to attach the lid cover to the lid.

5. The cooking appliance of claim 3, wherein:
the lid cover comprises as least one reinforcing rib extending from the second surface in a direction generally opposite the first surface; and,
in the second mode of operation, the at least one reinforcing rib is operable to be seated on the working surface, allowing the lid to be placed on the first surface of the lid cover.

6. The cooking appliance of claim 5, wherein:
the base is substantially circular in shape; and,
a reinforcing rib of the at least one reinforcing rib is substantially of annular shape.

7. The cooking appliance of claim 6, wherein a reinforcing rib of the at least on reinforcing rib extends radially to connect with the reinforcing rib of substantially annular shape, so as to reinforce the strength of the at least one reinforcing rib.

8. The cooking appliance of claim 7, wherein:
the lid comprises a radial protrusion;
the cooker body comprises a receiving groove;
the radial protrusion is operable to engage with the receiving groove, thereby substantially preventing the lid from rotating relative to the cooker body;
the at least one first reinforcing rib comprises a cut-out portion; and
when the lid cover is in the first mode of operation, the radial protrusion is received within the cut-out portion.

9. The cooking appliance of claim 8, wherein the cut-out portion extends through a thickness of the base, so as to receive the radial protrusion when the support structure is in the second mode of operation.

10. The cooking appliance of claim 1, wherein the lid cover comprises asbestos or quartz embedded therein.

11. The cooking appliance of claim 1, wherein:
the cooker body comprises a first coupler;
the lid comprises a second coupler;
the heating element is operatively connected to the second coupler; and,
opening the lid relative to the cooker body causes the first coupler to disconnect from the second coupler, thereby stopping the operation of the heating element.

12. The cooking appliance of claim 1, wherein the lid further includes a fan configured to blow air heated by the heating element into the cooker body.

13. A cooking appliance comprising:
a cooker body;
a lid for removably covering an opening to the cooker body, the lid comprising a heating element for generating heat within the cooker body when the lid is covering the opening; and,
a lid cover removably attachable to the lid and being operable to be placed on a working surface to support the lid, the lid cover comprising a base having a first surface and a second surface opposite the first surface;
wherein the lid cover has at least a first mode of operation and a second mode of operation;
wherein in the first mode, the second surface faces the lid, and in the second mode, the first surface faces lid; and,
wherein the lid cover is rotatable relative to the lid by a predetermined angle to removably detach the lid cover from the lid such that when cooking using the cooking appliance is ongoing, the lid is covering the opening of the cooker body without the lid cover attached to the lid.

14. The cooking appliance of claim 13, wherein in the first mode, when cooking using the cooking appliance is complete, the lid cover may be attached to the lid for ease of placement or storage of the lid.

15. The cooking appliance of claim 13, wherein in the second mode, when cooking using the cooking appliance is ongoing, the lid cover may be placed on the working surface, for placement of the lid on the lid cover, or retrieval therefrom, without the lid a contacting the working surface.

16. The cooking appliance of claim 13, wherein:
the lid cover comprises a first plurality of locking members and the lid comprises a second plurality of locking members;

when the lid cover is in the first mode, each of the locking members of the first plurality engage or align with a corresponding locking member of the second plurality, so as to attach the lid cover to the lid.

17. The cooking appliance of claim 13, wherein:

the cooker body comprises a first coupler;

the lid comprises a second coupler;

the heating element is operatively connected to the second coupler; and, opening the lid relative to the cooker body causes the first coupler to disconnect from the second coupler, thereby stopping the operation of the heating element.

18. The cooking appliance of claim 13, wherein the lid further includes a fan configured to blow air heated by the heating element into the cooker body.

\* \* \* \* \*